United States Patent
Han et al.

(10) Patent No.: US 7,924,389 B2
(45) Date of Patent: Apr. 12, 2011

(54) LIQUID CRYSTAL DISPLAY WITH HOUSING EXPOSED FLEXIBLE PRINTED CIRCUIT

(75) Inventors: Ho-Seok Han, Suwon-si (KR);
Myung-Han Lee, Seoul (KR);
Jeong-Geun Yoo, Yongin-si (KR);
Sung-Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 457 days.

(21) Appl. No.: 12/148,342

(22) Filed: Apr. 17, 2008

(65) Prior Publication Data

US 2008/0303972 A1 Dec. 11, 2008

(30) Foreign Application Priority Data

Jun. 7, 2007 (KR) .................. 10-2007-0055623

(51) Int. Cl.
*G02F 1/1345* (2006.01)
*G02F 1/1333* (2006.01)

(52) U.S. Cl. .......... 349/150; 349/58; 349/149; 349/151; 349/152

(58) Field of Classification Search .......... 349/58, 349/149–152; 361/681, 749, 752; 362/630, 362/631, 632, 633
See application file for complete search history.

(56) References Cited

U.S. PATENT DOCUMENTS

| | | | | |
|---|---|---|---|---|
| 6,342,932 B1 * | 1/2002 | Terao et al. | ...................... | 349/58 |
| 6,583,843 B2 * | 6/2003 | Ishino | ............................ | 349/149 |
| 6,930,737 B2 * | 8/2005 | Weindorf et al. | ................ | 349/96 |
| 6,945,789 B2 * | 9/2005 | Kuwaharada et al. | ........... | 439/67 |
| 7,088,403 B2 * | 8/2006 | Kim | .............................. | 349/58 |
| 7,161,650 B2 * | 1/2007 | Hirano | ........................... | 349/150 |
| 7,796,214 B2 * | 9/2010 | Tsai et al. | ........................ | 349/65 |
| 2004/0263505 A1 | 12/2004 | Tsubokura et al. | | |
| 2005/0179850 A1 | 8/2005 | Du | | |
| 2006/0285353 A1 | 12/2006 | Kim | | |

FOREIGN PATENT DOCUMENTS

| | | |
|---|---|---|
| JP | 2005-17964 | 1/2005 |
| KR | 2006-0070343 | 6/2006 |
| KR | 2007-0000073 | 1/2007 |

OTHER PUBLICATIONS

Patent Abstracts of Japan, Publication No. 2005-017964, Jan. 20, 2005, 1 p.
Korean Patent Abstracts, Publication No. 1020060070343, Jun. 23, 2006, 1 p.

(Continued)

*Primary Examiner* — Hoan C Nguyen
(74) *Attorney, Agent, or Firm* — Innovation Counsel LLP

(57) ABSTRACT

Provided are a liquid crystal display (LCD) that has a reduced cost due to an increase in the thickness of the FPC board included of the display. The liquid crystal display includes a liquid crystal panel, a first housing having a first side and a second side and a plurality of sides, the liquid crystal panel being accommodated on the first side, a flexible printed circuit board having a first side in contact with the liquid crystal panel, and a second side disposed adjacent to the second side of the first housing, a second housing having a bottom, an opening, and a plurality of sides extending from the bottom to define a cavity, wherein the plurality of sides are fastened to the first housing, further wherein the opening is formed through the bottom to expose at least a portion of the flexible printed circuit board, and a reflective sheet disposed on a interior surface of the bottom.

13 Claims, 7 Drawing Sheets

OTHER PUBLICATIONS

Korean Patent Abstracts, Publication No. 1020070000073, Jan. 2, 2007, 1 p.

EP Search Report, Sep. 25, 2008, corresponding to European Patent Appliction 08009790.0, 8 pp.

\* cited by examiner

LIQUID CRYSTAL DISPLAY WITH HOUSING EXPOSED FLEXIBLE PRINTED CIRCUIT

CROSS REFERENCE TO RELATED APPLICATION

This application claims priority from Korean Patent Application No. 10-2007-0055623 filed on Jun. 7, 2007 in the Korean Intellectual Property Office, the disclosure of which is incorporated herein by reference in its entirety.

BACKGROUND OF THE INVENTION

1. Field of the Invention

The present invention relates to a liquid crystal display, and particularly a liquid crystal display that has a reduced manufacturing cost due to an increase in the thickness of the FPC (Flexible Printed Circuit) board included in the display.

2. Description of the Related Art

Liquid crystal displays, widely-used flat panel displays, include two substrates with electrodes and a liquid crystal layer inserted between the substrates. Control of the amount of light transmitted through the liquid crystal layer is achieved by applying voltage to the electrodes to rearrange the liquid crystal molecules in the liquid crystal layer. These liquid crystal displays have the advantage of small size, light weight, and low energy consumption.

Liquid crystal displays are used by almost all data products which need compact displays, including not only small-sized products, such as mobile phones and PDAs (Portable Digital Assistants), but also middle/large-sized products, such as monitors and television receivers.

Liquid crystal displays include a flexible printed circuit board that transmits signals to the upper and lower substrates in response to an applied voltage. The flexible printed circuit board is expensive to manufacture and the manufacturing cost increases with a decrease in thickness.

Desirable features for liquid crystal displays include a lightweight, thin, and simple structure, and a low manufacturing cost. These features are especially desirable for liquid crystal displays used in small products such as mobile phones.

Therefore, it is desirable to provide a liquid crystal display including a flexible printed circuit board that is as thick as possible, while not increasing the entire thickness of the display.

SUMMARY OF THE INVENTION

An object of the present invention is to provide a liquid crystal display with a reduced manufacturing cost due to an increased thickness of a flexible printed circuit board.

Objects of the present invention are not limited to those mentioned above, and other objects of the present invention will be understood by those skilled in the art through the following description.

According to an aspect of the present invention, there is provided a liquid crystal display comprising: a liquid crystal panel, a first housing having a first side and a second side and a plurality of sides, the liquid crystal panel being accommodated on the first side, a flexible printed circuit board having a first side in contact with the liquid crystal panel, and a second side disposed adjacent to the second side of the first housing, a second housing having a bottom, an opening, and a plurality of sides extending from the bottom to define a cavity, wherein the plurality of sides are fastened to the first housing, further wherein the opening is formed through the bottom to expose at least a portion of the flexible printed circuit board, and a reflective sheet disposed on a interior surface of the bottom.

According to another aspect of the present invention, there is provided a liquid crystal display comprising: a liquid crystal panel, a first housing having a plurality of sides and where the liquid crystal panel is accommodated from above, a flexible printed circuit board of which a side is in contact with the liquid crystal panel and the other side is disposed under the first housing, and a second housing having a bottom where the reflective sheet adheres, sides that are formed along the edge of the bottom and fastened to the first housing, and an opening that extends from the bottom to the side of the second housing to expose the flexible printed circuit board, and a reflective sheet disposed on the bottom of the second housing.

BRIEF DESCRIPTION OF THE DRAWINGS

The above and other features and advantages of the present invention will become apparent by describing in detail preferred embodiments thereof with reference to the attached drawings in which.

DESCRIPTION OF THE PREFERRED EMBODIMENTS

Figure 1:
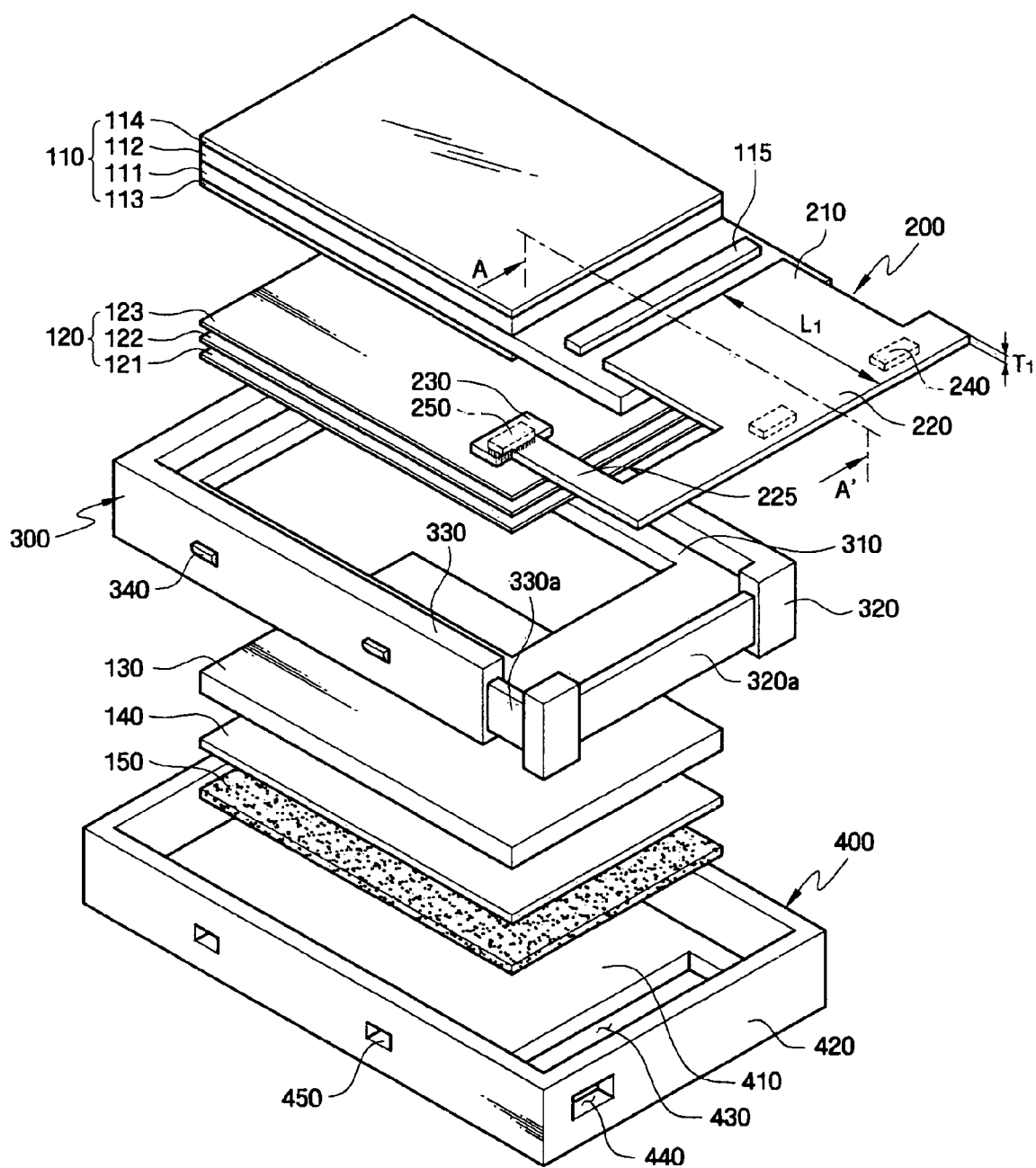
FIG. 1 is an exploded perspective view of a liquid crystal display according to a first embodiment of the invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Embodiments described herein will be described referring to plan views and/or cross-sectional views by way of ideal schematic views of the invention. Accordingly, the exemplary views may be modified depending on manufacturing technologies and/or tolerances. Therefore, the embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the invention.

Preferred embodiments of the invention will be described hereafter in detail with reference to the accompanying drawings.

Figure 2:
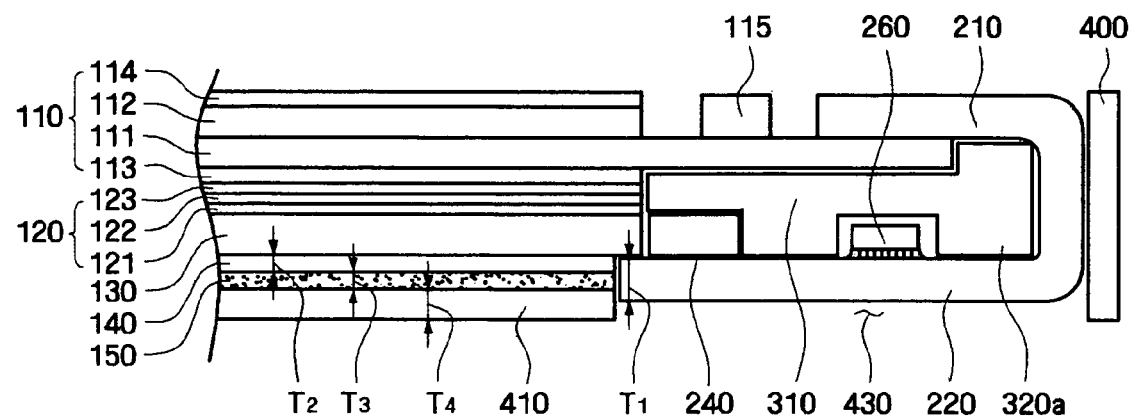
FIG. 2 is a cross-sectional view of the liquid crystal display taken along the line A-A' of FIG. 1.

A liquid crystal display according to an embodiment of the invention is described with reference to FIGS. 1 and 2 in the following. FIG. 1 is an exploded perspective view of a liquid crystal display according to a first embodiment of the invention. FIG. 2 is a cross-sectional view of the liquid crystal display taken along the line A-A' of FIG. 1.

Referring to FIG. 1, a liquid crystal display according to an embodiment of the invention generally includes a liquid crystal panel 110, an optical sheet 120, a light guide panel 130, a reflective sheet 140, an adhesive layer 150, a flexible printed circuit board 200, a first housing 300, and a second housing 400.

The liquid crystal panel 110 includes a first display plate 111 that includes gate lines (not shown), data lines (not shown), thin film transistor arrays, and pixel electrodes, a second display plate 112 that includes black matrices and common electrodes, and faces the first display plate 111, a first polarizing plate 113 that is disposed under the first display plate 111, and a second polarizing plate 114 that is disposed on the second display plate 112. A liquid crystal layer (not shown) is provided between the first display plate 111 and the second display plate 112.

The liquid crystal panel 110 including display plates and polarizing plates is disposed inside the first housing 300 (described later). In detail, the liquid crystal panel 110 may be disposed on the seating step 310 from above the first housing 300. A driver integrated circuit 115 for driving the liquid crystal display and the flexible printed circuit board 200 may be disposed at one side of the liquid crystal panel 110. The driver integrated circuit 115 is electrically connected with the flexible printed circuit board 200 to receive a driving voltage from the flexible printed circuit board 200.

The optical sheet 120 is disposed under the liquid crystal panel 110. The optical sheet 120 diffuses or concentrates light that passes through the light guide panel 130 from light-source, i.e., point-light-sources 240. The optical sheet 120 includes a diffusion sheet 121, a first prism sheet 122, and a second prism sheet 123.

The diffusion sheet 121 is disposed on the light guide panel 130, and improves luminance and uniformity of luminance of the incident light from the light-source, i.e., point-light-sources 240.

The first prism sheet 122 and the second prism sheet 123 that concentrate and transmit the light diffused by the diffusion sheet 121 are disposed sequentially on the diffusion sheet 121. However, the second prism sheet 123 may be removed when it is sufficient to ensure the luminance and the viewing angle only with the first prism sheet 122.

The optical sheet 120 according to the present embodiment is accommodated inside the first housing 300, together with the liquid crystal panel 110. Specifically, the optical sheet 120 may be in direct contact with the liquid crystal panel 110, on the light guide panel 130. The optical sheet 120, however, may be separated from the liquid crystal panel 110 by a separator (not shown) provided in the first housing 300.

Figure 3:
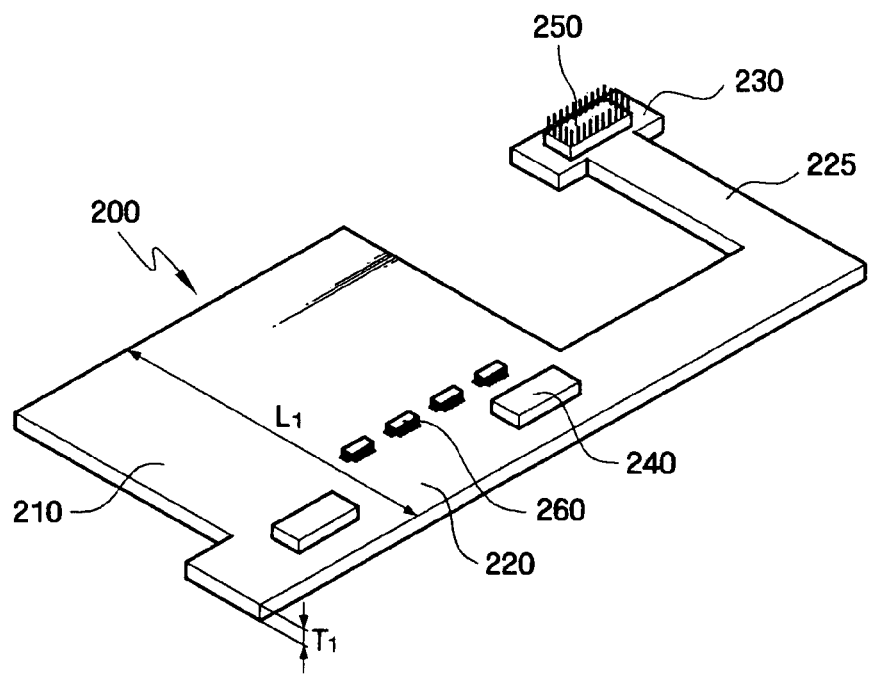
FIG. 3 is a perspective view seen from the bottom of the flexible printed circuit board included in the liquid crystal display according to the first embodiment of the invention.

The flexible printed circuit board included in the liquid crystal display according to the first embodiment of the invention is described with reference to FIGS. 1 and 3 in the following. FIG. 3 is a perspective view seen from the bottom of the flexible printed circuit board 200 included in the liquid crystal display according to the first embodiment of the invention.

Referring to FIGS. 1 and 3, a side 210 of the flexible printed circuit board 200 contacts with the liquid crystal panel 110, i.e., the first display plate 111. The flexible printed circuit board 200 is bent along the sides 320 and 330 of the first housing (described later), in detail, a first guide groove 320a of the first housing 300, and the other side 220 of the flexible printed circuit board 200 is attached to the lower side of the seating step 310 of the first housing 300.

Though not shown, the edge of the side 220 of the flexible printed circuit board 200 may be provided with an adhesive layer (not shown), such as double-sided tape, which allows the side 220 of the flexible printed circuit board 200 to adhere to the first housing 300. A plurality of driving components 260 are mounted at the side 220 of the flexible printed circuit board 200 for processing all of the gate driving signals and the data driving signals to apply the gate driving signals and data driving signals.

Further, the flexible printed circuit board 200 is provided with the light-source, i.e., point-light-sources 240 providing light to the liquid crystal display, which is a passive light-emitting device. The flexible printed circuit board 200 may have an extension 225 that extends from the side 220 of the flexible printed circuit board and a connector-mounted portion 230 connected to the extension 225. Since the flexible printed circuit board 200 has the extension 225 that extends perpendicularly from the side 220, it has a U-shape.

The flexible printed circuit board 200 is a film having a predetermined thickness $T_1$, and the smaller the thickness $T_1$, the more the manufacturing cost increases. Accordingly, the manufacturing cost can be saved by increasing the thickness $T_1$ of the flexible printed circuit board 200. It is possible to maintain the entire thickness of the liquid crystal display, even though the thickness $T_1$ of the flexible printed circuit board 200 increases, by adjusting the length $L_1$ of the flexible printed circuit board 200 such that the side 220 of the flexible printed circuit board 200 does not overlap the reflective sheet 140 (described later). When the length L1 of the flexible printed circuit board 200 is adjusted as described above, the flexible printed circuit board 200 does not overlap the reflective sheet 140 and the adhesive layer 150 for bonding the reflective sheet 140 to the second housing 400. Accordingly, although the thickness T1 of the flexible printed circuit board 200 increases, the entire thickness of the liquid crystal display does not increase as compared with when the flexible printed circuit board 200 overlaps the reflective sheet 140.

An LED (Light Emitted Diode) may be used for the light-source, i.e., point-light-sources 240 at the side 220 of the flexible printed circuit board 200. The light-source, i.e., point-light-sources 240 are disposed parallel with the side of the light guide panel 130 (described later) and transmit light to the light guide panel 130. An external voltage is applied through a connector 250 mounted on the connector-mounted portion 230 of the flexible printed circuit board 200.

Figure 4:
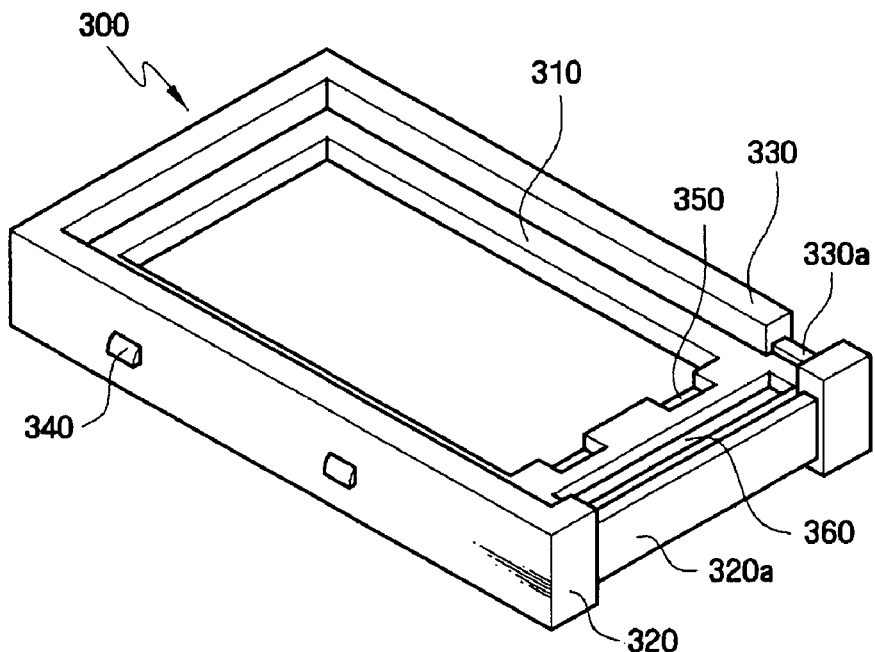
FIG. 4 is a perspective view seen from the bottom of a first housing included in the liquid crystal display according to the first embodiment of the invention.
Figure 5:
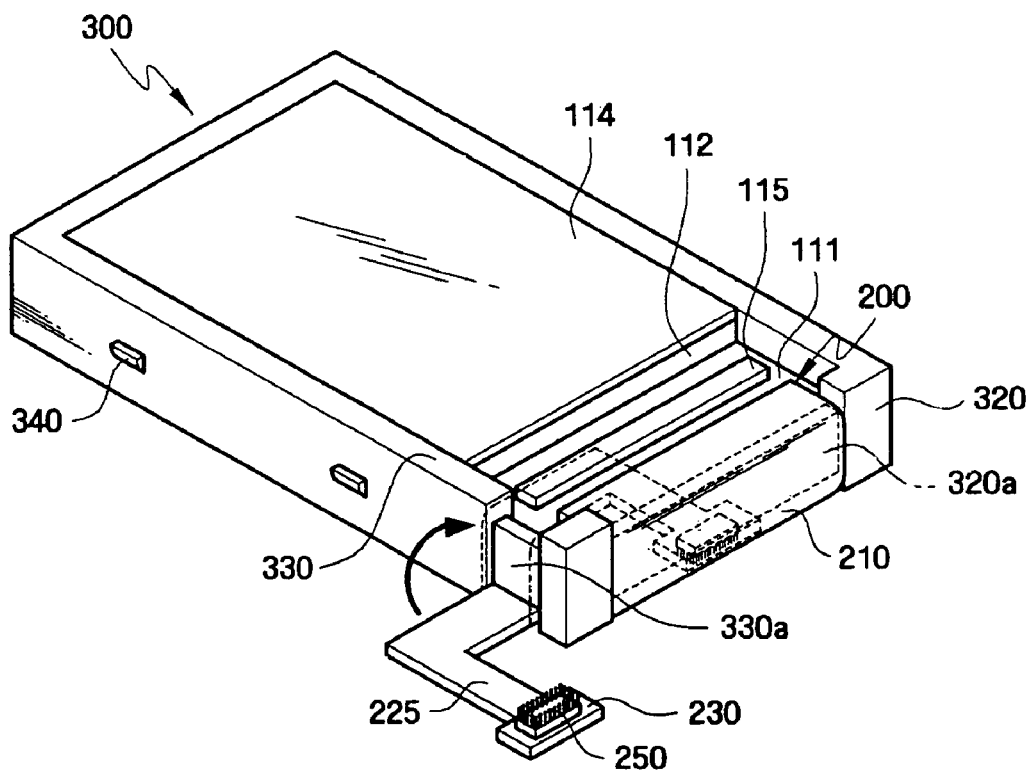
FIG. 5 is a perspective view illustrating the arrangement of the flexible printed circuit board in the first housing according to the first embodiment of the invention.

The first housing according to the first embodiment of the invention is described in detail with reference to FIGS. 1, 4, and 5 in the following. FIG. 4 is a perspective view seen from the bottom of the first housing included in the liquid crystal display according to the first embodiment of the invention. FIG. 5 is a perspective view illustrating the arrangement of the flexible printed circuit board in the first housing according to the first embodiment of the invention.

The first housing 300 may be a frame with a plurality of sides 320 and 330. The first housing 300 may be a rectangular frame. The first housing-sides 320 and 330 include first housing-first sides 320 that are longitudinally formed and first housing-second sides 330 that are transversely formed in connection with the first housing sides 320. For example, the first housing 300 may be made of a white plastic having good reflection and workability. When the first housing 300 is white, the light that has passed through the light guide panel 130 reflects from the sides 320 and 330 of the first housing 300, which minimizes loss of light. Further, the first housing 300 is made of plastic, so that it is easy to form the seating step 310, the first guide groove 320*a*, and the second guide groove 330*a*, which will be described later.

The first guide groove 320*a* is formed on one of the first housing sides 320 to guide the bending of the flexible printed circuit board 200. The first guide groove 320*a* may be engraved on the first housing-first side 320 to reduce the height and thickness of the first housing-first side 320. Since the first guide groove 320*a* is smaller in height and thickness than the first housing-first side 320, when the side 210 of the flexible printed circuit board 200 is disposed along the first guide groove 320*a*, it is possible to reduce the thickness of the flexible printed circuit board 200 protruding outside the first housing 300. The first guide groove 320*a* overlaps an opening 440 of the second housing 400 (described later) and the flexible printed circuit board 200 is accommodated in the opening 440. Therefore, the other side of the flexible printed circuit board 200 does not overlap the bottom 410 of the second housing 400 (described later).

The first housing 300 further has the seating step 310 formed along the inside of the sides 320 and 330. The first housing 300 formed of the sides 320, 330 is open at the center and the seating step 310 protrudes from the sides 320 and 330 toward the center of the first housing 300. The liquid crystal panel 110 and the optical sheet 120 are disposed on the seating step 310 as described above. On the other hand, the optical sheet 120 may be disposed on a side of the seating sheet 310, attached to the liquid panel 110. The width of a side of the seating sheet 310 adjacent to the first guide groove 320*a* extends to the center. A point-light-source groove 350 and a driving component groove 360 are formed on the lower surface of the width-extended side of the seating sheet 310 to accommodate the point-light-source 240 and a driving component 260 mounted on the side 220 of the flexible printed circuit board 200.

The first housing-second side 330 may be perpendicular to the first housing-first side 320. The first housing-second side 330 has the second guide groove 330*a* that guides the extension 225 of the flexible printed circuit board 200. The extension 225 of the flexible printed circuit board 200 bends in the direction of arrow shown in FIG. 5 and overlaps a side 210 of the flexible printed circuit board 200 with the connector 250 facing the lower side of the first housing 300. The second guide groove 330*a* is formed such that it overlaps the opening 440 of the second housing 400 (described later) and the flexible printed circuit board 200 is accommodated in the opening 440. Therefore, the flexible printed circuit board 200 does not overlap the bottom 410 of the second housing 400. Fastening protrusions 340 are formed on the first housing-second side 330 to fasten the first housing 300 to the second housing 400.

Figure 6:
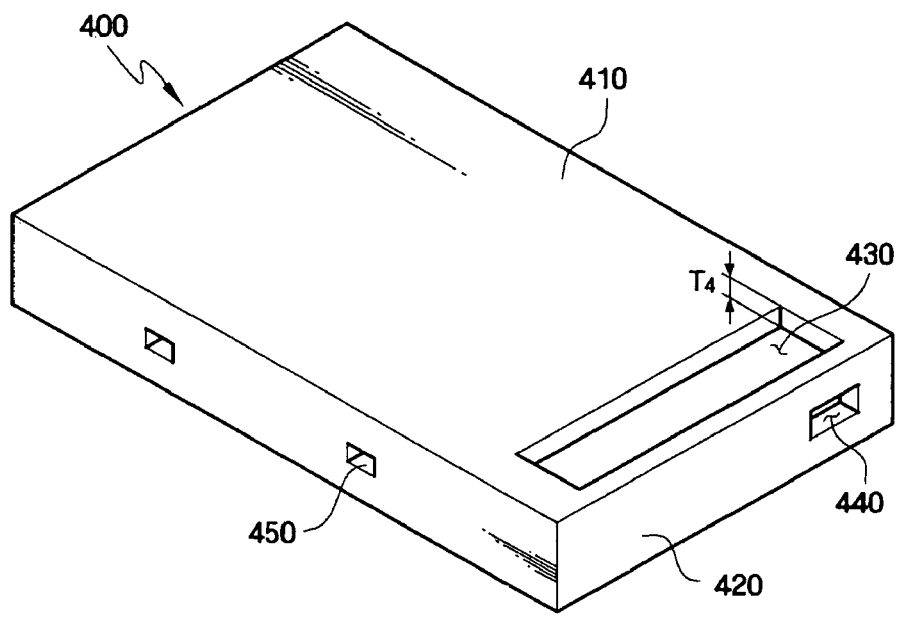
FIG. 6 is a perspective view seen from the bottom of a second housing included in the liquid crystal display according to the first embodiment of the invention.
Figure 7:
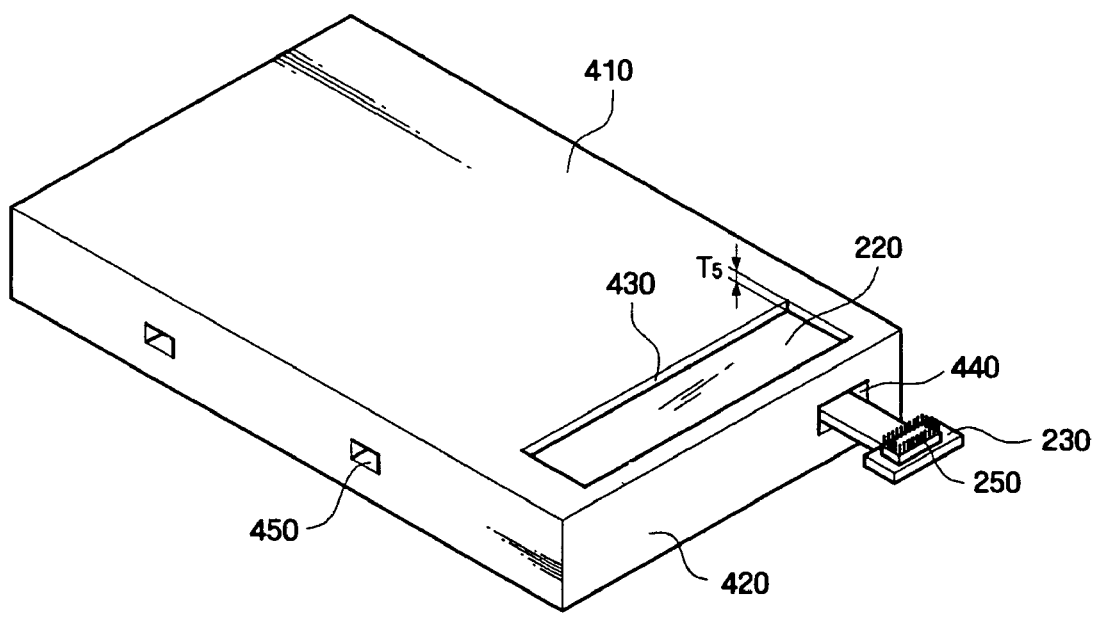
FIG. 7 is a perspective view illustrating the arrangement of the flexible printed circuit board in the second housing according to the first embodiment of the invention.

The optical waveguide 130, the reflective sheet 140, the adhesive layer 150, and the second housing 400 included in the liquid crystal display according to the first embodiment of the invention are described hereafter in detail with reference to FIGS. 1, 2, 6, and 7. FIG. 6 is a perspective view seen from the bottom of a second housing 400 included in the liquid crystal display according to the first embodiment of the invention. FIG. 7 is a perspective view illustrating the arrangement of the flexible printed circuit board in the second housing according to the first embodiment of the invention.

The optical waveguide 130 is disposed under the first housing 300 and guides light emitted from the point-light-source 240. The optical waveguide 130 may be formed of a light transmissive material such as, for example, an acrylic resin such as PMMA (PolyMethyl MethAcrylate), or PC (PolyCarbonate) that has a constant refractive index, in order to effectively guide light. A dispersion pattern (not shown) may be provided on a side of the optical waveguide 130 to transmit the light upward that has entered the optical waveguide 130 through a side.

The reflective sheet 140 is disposed under the optical waveguide 130 and reflects light upward that is transmitted to the second housing 400.

The adhesive layer 150 is disposed under the reflective sheet 140 to attach the reflective sheet 140 to the bottom 410 of the second housing 400. The adhesive layer 150 may be, for example, double-sided tape.

The second housing 400 accommodates the optical waveguide 130 and the reflective sheet 140 and is fastened to the first housing 300. The second housing 400 may be made of a metal at the lowermost of the liquid crystal display to protect the accommodated components, and is also called a "bottom chassis".

The second housing 400 has the bottom 410 where the reflective sheet 140 adheres and sides 420 that are formed along the edge of the bottom 410, and is fastened to the first housing 300.

The bottom 410 may be formed in a predetermined thickness $T_4$, and the reflective sheet 140 adheres to the bottom 410 and the optical waveguide 130 is supported.

The opening 440 is formed through a side of the bottom 410. The opening 440 is formed by cutting off a portion of the bottom 410. The side 220 of the flexible printed circuit board 200 is exposed through the opening 440. The side 220 of the flexible printed circuit board 200 is disposed under the first housing 300, and does not overlap the reflective sheet 140 and the adhesive layer 150, so that it is possible to increase the thickness $T_1$ of the flexible printed circuit board 200 (described above). Further, since the flexible printed circuit board 200 does not overlap the second housing 400 by the opening 440 of the second housing 400, it is possible to increase the thickness $T_1$ of the flexible printed circuit board 200. That is, as shown in FIG. 2, the thickness $T_1$ of the flexible printed circuit board 200 can be set such that the flexible printed circuit board 200 does not protrude from the bottom 410 of the second housing 400. According to this configuration, the thickness $T_1$ of the flexible printed circuit board 200 is equal to or smaller than the sum of the thickness $T_2$ of the reflective sheet 140, the thickness $T_3$ of the adhesive layer 150, and the thickness $T_4$ of the bottom 410. When the flexible printed circuit board 200 is accommodated in the second housing 400 through the opening 440, the outside of the bottom 410 of the second housing 400 may be spaced at a predetermined thickness $T_5$ from the side 220 of the flexible printed circuit board 200. Accordingly, by forming the opening 440 in the second housing 400, the thickness $T_1$ of the flexible printed circuit board 200 can be increased; therefore, it is correspondingly possible to save the manufacturing cost of the expensive flexible printed circuit board 200. Further, an adhesive layer for fixing the flexible printed circuit board 200 to the second housing 400 is not needed because of the opening 440, so that it is possible to reduce adhesion costs.

The sides 420 are formed along the edge of the bottom 410 of the second housing 400, and define an accommodating space. A connector-mounted portion connection groove 440 is formed at one of the sides 420 of the second housing such that the connector-mounted portion 230 of the flexible printed circuit board 200 protrudes from the inside to the outside of the second housing 400. Accordingly, the connector 250 mounted on the flexible printed circuit board 200 is exposed outside the second housing 400 and drives the liquid crystal display using a voltage applied from the outside. Further, fastening grooves 450 may be formed on the sides 420 of the second housing for fastening to the first housing. The fastening protrusions 340 of the first housing 300 are fitted in the fastening grooves 450.

The upside of the liquid crystal display described above, i.e., the upside of the liquid display panel 110, may be protected by a top chassis (not shown) or a separate protection cover in apparatuses such as mobile phones.

Figure 8:
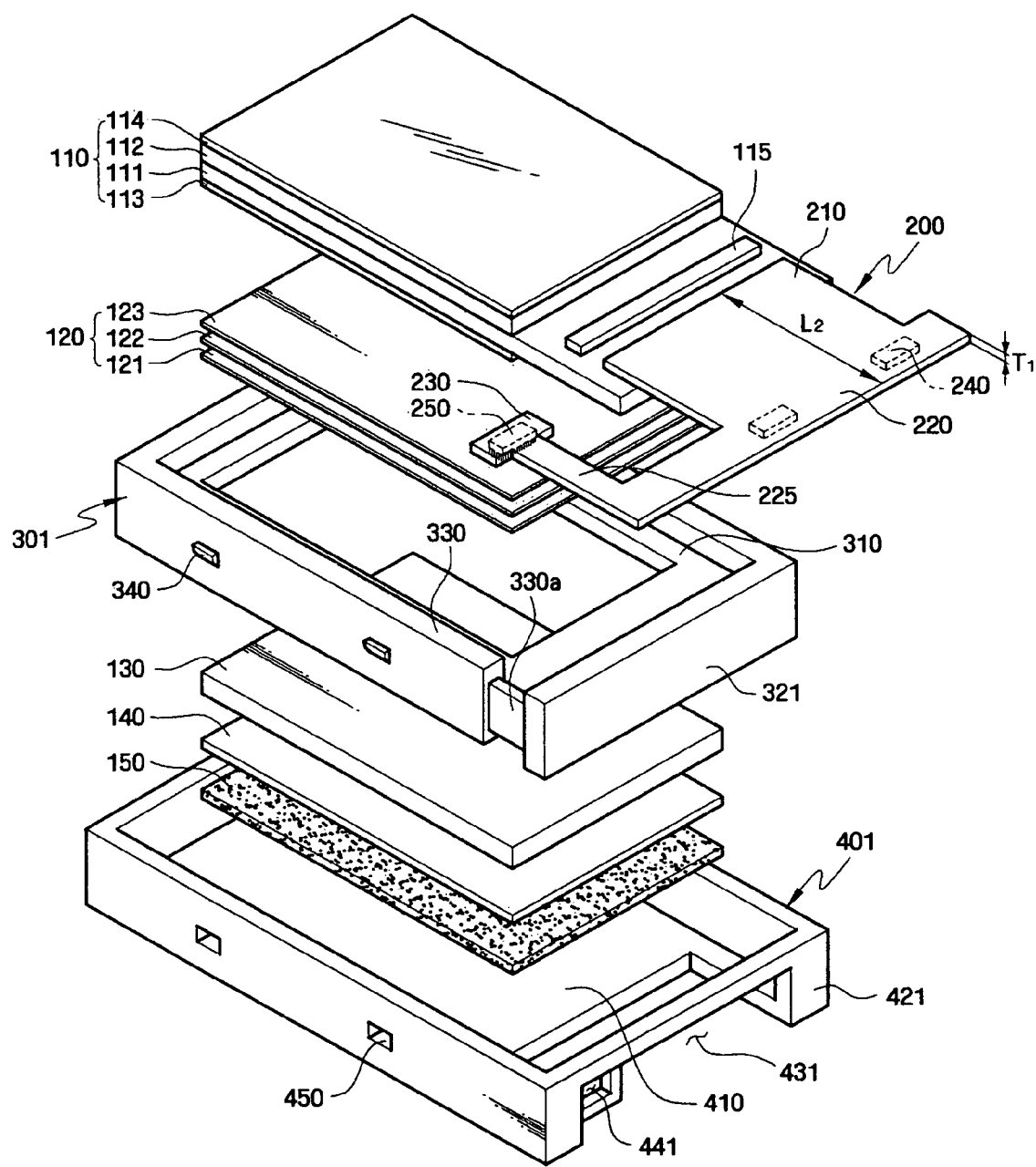
FIG. 8 is an exploded perspective view of a liquid crystal display according to a second embodiment of the invention.
Figure 9:
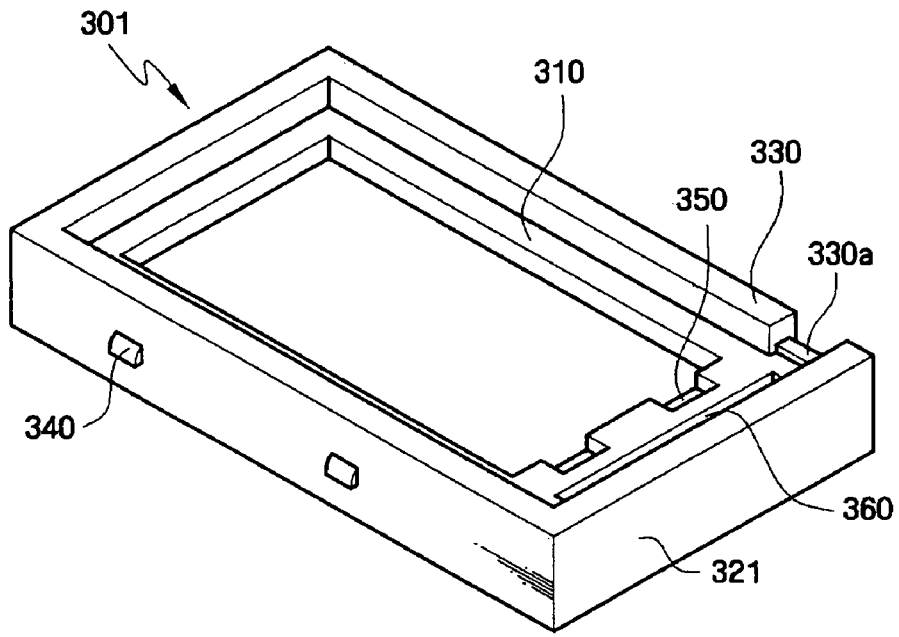
FIG. 9 is a perspective view seen from the bottom of a first housing included in the liquid crystal display according to the second embodiment of the invention.
Figure 10:
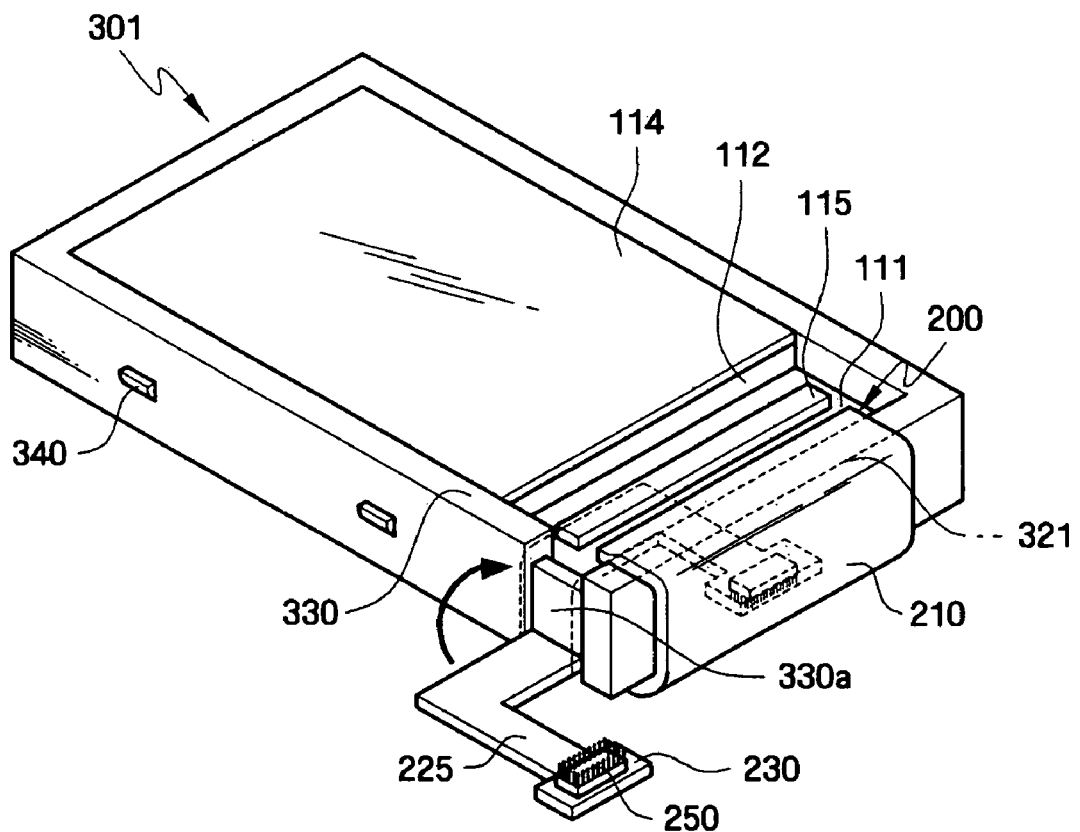
FIG. 10 is a perspective view illustrating the arrangement of the flexible printed circuit board in the first housing according to the second embodiment of the invention.

A liquid crystal display according to the second embodiment of the invention is described in detail with reference to FIGS. 8 to 10 in the following. FIG. 8 is an exploded perspective view of a liquid crystal display according to the second embodiment of the invention. FIG. 9 is a perspective view seen from the bottom of the first housing 301 included in the liquid crystal display according to the second embodiment of the invention. FIG. 10 is a perspective view illustrating the arrangement of the flexible printed circuit board in the first housing according to the second embodiment of the invention. For simple description, members having the same functions as the members shown in the figures relating to the first embodiment are denoted by the same reference numerals and not described below. The liquid crystal display according to the present embodiment has the same configuration as the liquid crystal display according to the first embodiment of the invention except that the structure of the first and second housings and the length of the flexible printed circuit board are partially different.

Referring to FIGS. 8 to 10, the first housing 301 according to the present embodiment may be a rectangular frame and has a plurality of sides 321 and 330 and a seating step 310 formed along the sides 321 and 330. The sides 321 and 330 of the first housing include a first housing-first sides 321 and a first housing-second sides 330. A guide groove is not formed on the first housing-first sides 321 according to the present embodiment, unlike the first embodiment. Therefore, it is easy to manufacture the first housing 301. The flexible printed circuit board 200 bends along the outside of the first housing-first side 321. For this reason, the length $L_2$ of the flexible printed circuit board 200 may be larger than the first embodiment. A second guide groove 330a that guides the extension 225 of the flexible printed circuit board 200 bending is formed on the first housing-second side 330 adjacent to the first housing-first side 321. The extension 225 of the flexible printed circuit board 200 bends in the direction of the arrow, and overlaps a side 210 of the flexible printed circuit board 200. The second guide groove 330a prevents the flexible printed circuit board 200 from excessively protruding outside of the first housing-second side 330. The second guide groove 330a overlaps an opening 431 (described later), and the flexible printed circuit board 200 is accommodated in the opening 431.

Figure 11:
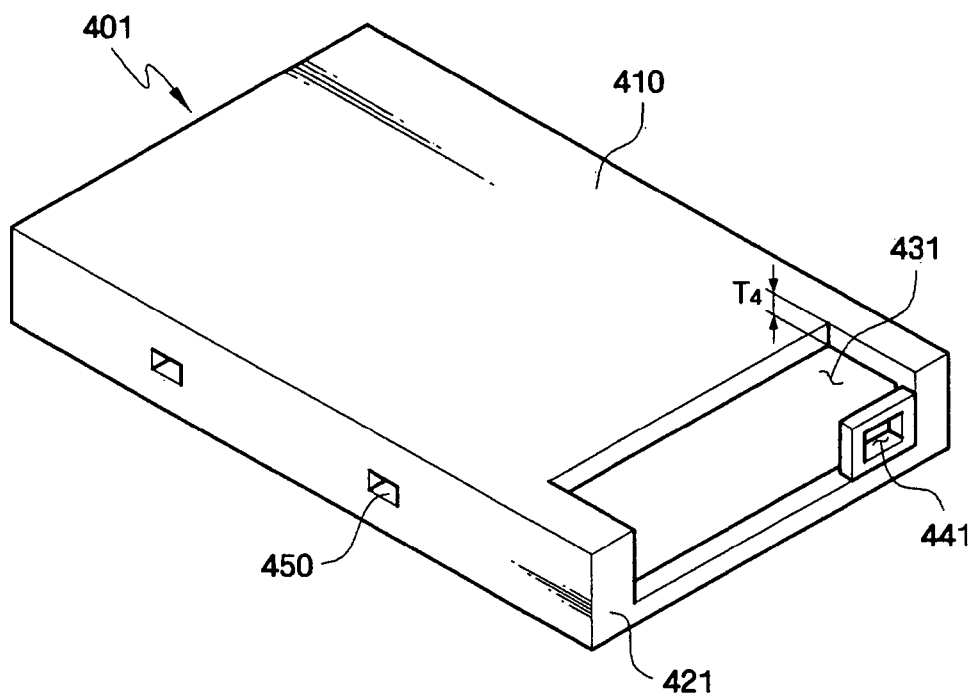
FIG. 11 is a perspective view seen from the bottom of a second housing included in the liquid crystal display according to the second embodiment of the invention.
Figure 12:
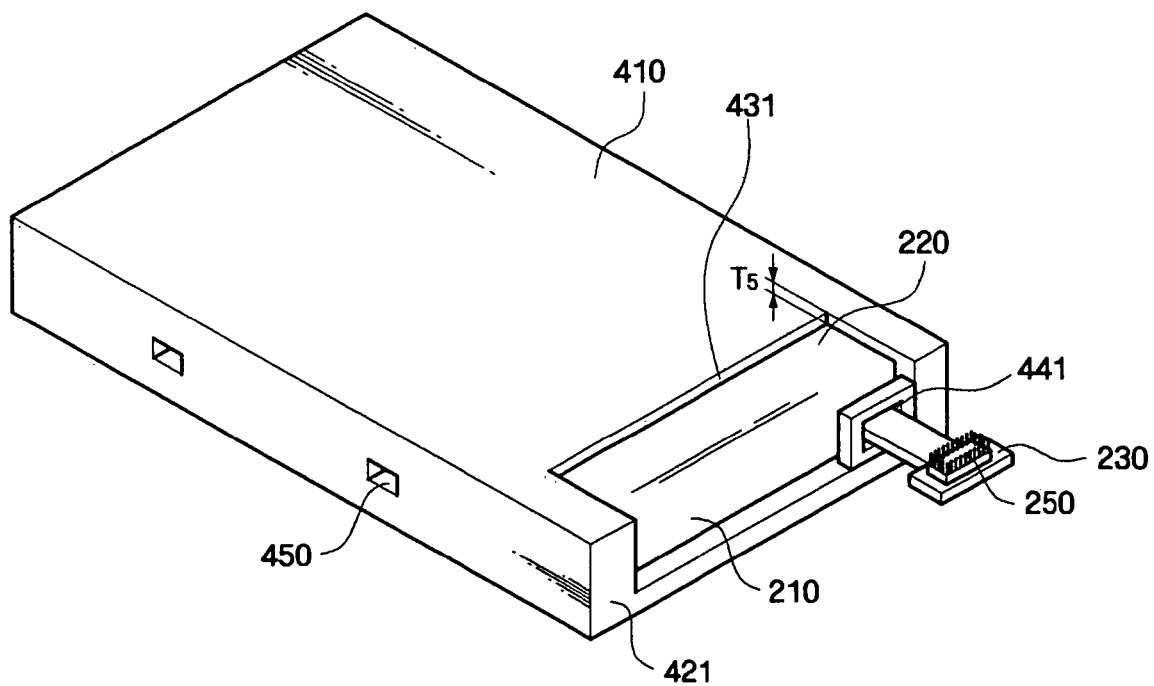
FIG. 12 is a perspective view illustrating the arrangement of the flexible printed circuit board in the second housing according to the second embodiment of the invention.

The second housing according to the second embodiment of the invention is now described in detail with reference to FIGS. 8, 11, and 12. FIG. 11 is a perspective view seen from the bottom of a second housing included in the liquid crystal display according to the second embodiment of the invention. FIG. 12 is a schematic view illustrating the arrangement of the flexible printed circuit board in the second housing according to the second embodiment of the invention.

Referring to FIGS. 8, 11, and 12, the opening 431 of the second housing 401 according to the present embodiment extends from the bottom 410 to the side 420 of the second housing. A part of the flexible printed circuit board 200, except a side 210 on the first housing 301, is accommodated in the opening 431, not overlapping the bottom 410 and the side 420 of the second housing 401. Accordingly, the flexible printed circuit board 200 is also disposed under the first housing 301, not overlapping the reflective sheet 140. Further, considering the space defined by the opening 431, it is possible to increase the thickness $T_1$ of the flexible printed circuit board 200. According to this configuration, the thickness $T_1$ of the flexible printed circuit board 200 may be equal to or less than the sum of the thickness of the reflective sheet 140, the thickness of the adhesive layer 150, and the thickness $T_4$ of the bottom 410. When the flexible printed circuit board 200 is accommodated in the second housing 401 through the opening 431, the side 220 of the flexible printed circuit board 200 is spaced a predetermined thickness $T_5$ from the bottom 410 and the outside of the side 420, thereby preventing damage to the flexible printed circuit board 200.

A connector-mounted portion connection groove 441 is formed at one side of the opening 431 of the side 420 such that the connector-mounted portion 230 of the flexible printed circuit board 200 protrudes outside.

As described above, the liquid crystal display of the embodiments of the invention produces the following effects.

First, it is possible to increase the thickness of a flexible printed circuit board without increasing the thickness of the liquid crystal display, by disposing the flexible printed circuit board such that it does not overlap a reflective sheet.

Second, by increasing the thickness of a flexible printed circuit board without increasing the thickness of a liquid crystal display by forming an opening in the second housing, it is possible to remove an adhesive layer for fixing the flexible printed circuit board to the second housing.

Third, it is possible to reduce manufacturing costs of a liquid crystal display by increasing the thickness of a flexible printed circuit board.

Although the present invention has been described in connection with the exemplary embodiments and modifications of the present invention, the invention is not limited to the above and it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A liquid crystal display comprising:
   a liquid crystal panel;
   a first housing having a first side and a second side and a plurality of side walls, the liquid crystal panel being accommodated on the first side;
   a flexible printed circuit board having a first side in contact with the liquid crystal panel, and a second side disposed adjacent to the second side of the first housing;
   a second housing having a bottom, an opening, and a plurality of sides extending from the bottom to define a cavity, wherein the plurality of sides are fastened to the first housing, further wherein the opening is formed through the bottom to expose at least a portion of the flexible printed circuit board; and
   a reflective sheet disposed on a interior surface of the bottom.

2. The liquid crystal display of claim 1, wherein the flexible printed circuit board bends along an end of the first housing, and further wherein the second side of the flexible printed circuit does not overlap the reflective sheet.

3. The liquid crystal display of claim 2, wherein the second side of the flexible printed circuit board is accommodated in the opening, nonoverlapping the bottom of the second housing.

4. The liquid crystal display of claim 1, further comprising:
   an adhesive layer between the reflective sheet and the interior surface of the bottom,
   wherein a thickness of the flexible printed circuit board is equal to or less than the sum of a thickness of the reflective sheet a thickness of the adhesive layer, and a thickness of the bottom.

5. The liquid crystal display of claim 1, wherein the first housing further includes a seating step formed along the inside of the plurality of side walls of the first housing.

6. The liquid crystal display of claim 5, wherein a light-source groove is formed beneath the seating step.

7. The liquid crystal display of claim 6, wherein the light-source is mounted on the second side of the flexible printed circuit board, and is accommodated in the light-source groove with the second side of the flexible printed circuit board adhering to the seating step.

8. The liquid crystal display of claim 2, wherein the plurality of side walls of the first housing include first housing-first sides having a first guide groove to guide the flexible printed circuit board bending and first housing-second sides adjacent to the first housing-first sides.

9. The liquid crystal display of claim 8, wherein the first guide groove overlaps the opening.

10. The liquid crystal display of claim 8, wherein the flexible printed circuit board further has an extension that extends perpendicularly from the second side of the flexible printed circuit board and a connector-mounted portion connected to the extension.

11. The liquid crystal display of claim 10, wherein the first housing-second side has a second guide groove to guide the extension bending.

12. The liquid crystal display of claim 11, wherein the second guide groove overlaps the opening.

13. The liquid crystal display of claim 10, wherein one of the plurality of sides of the second housing has a connector-mounted portion connection groove through which the connecter-mounted portion protrudes outside.

* * * * *